No. 735,122. PATENTED AUG. 4, 1903.
A. D. LUGIBIHL & H. D. ZEHRBACH.
CREAM SEPARATOR.
APPLICATION FILED MAY 28, 1903.

NO MODEL.

Witnesses
G. Howard Walmsley
Irvine Miller

Inventors
Adam D. Lugibihl,
and Henry D. Zehrbach,

By H. A. Toulmin
Attorney

No. 735,122. Patented August 4, 1903.

UNITED STATES PATENT OFFICE.

ADAM D. LUGIBIHL AND HENRY D. ZEHRBACH, OF BLUFFTON, OHIO.

CREAM-SEPARATOR.

SPECIFICATION forming part of Letters Patent No. 735,122, dated August 4, 1903.

Application filed May 28, 1903. Serial No. 159,059. (No model.)

*To all whom it may concern:*

Be it known that we, ADAM D. LUGIBIHL and HENRY D. ZEHRBACH, citizens of the United States, residing at Bluffton, in the county of Allen and State of Ohio, have invented certain new and useful Improvements in Cream-Separators, of which the following is a specification, reference being had therein to the accompanying drawings.

This invention relates to cream-separators, and more particularly to that type of separators disclosed in United States Letters Patent No. 683,128, issued September 24, 1901, in which an outer water vessel and inner milk vessel are employed, the two being connected at one point near their lower portions by a coupling, which permits the faucet and sight aperture or gage of the inner vessel to be extended and rendered visible and accessible through an opening in the outer vessel. Heretofore the inner vessel has been supported chiefly by an extension of its body portion downward, so as to permit it to rest upon the bottom of the outer vessel, as in said Letters Patent above referred to, or by means of a hook fitting loosely over the upper edge of the outer vessel, as in Patent No. 674,623, issued May 21, 1901. The former method of support is objectionable in that it obstructs the free circulation of water under the inner vessel, while both methods are objectionable in that they permit what may be termed the "rear" or "free" end of the inner vessel to move laterally. This lateral movement brings an undue strain upon the coupling or connection between the two vessels at the front thereof and tends to cause leakage at that point.

It is the object of our present invention to provide a simple and efficient connection between the inner and outer vessels at the side thereof opposite the coupling which may be readily detached and which will at the same time prevent any lateral motion of one vessel relatively to the other, thereby preventing straining at the coupling. To these ends our invention consists in certain novel features, which we will now proceed to describe and will then particularly point out in the claims.

Figure 1:
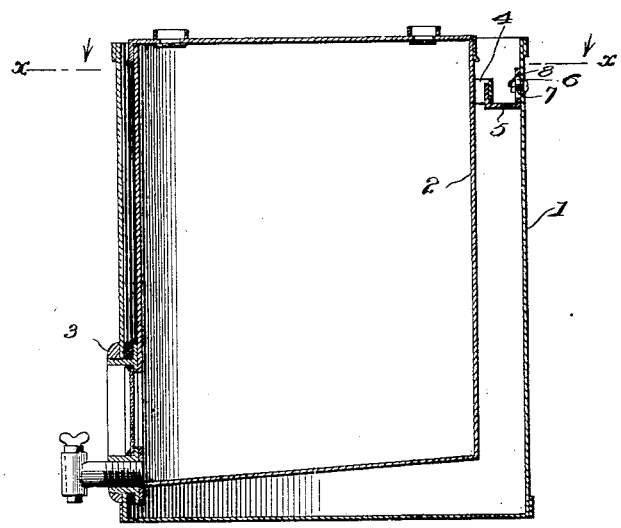
Figure 2:
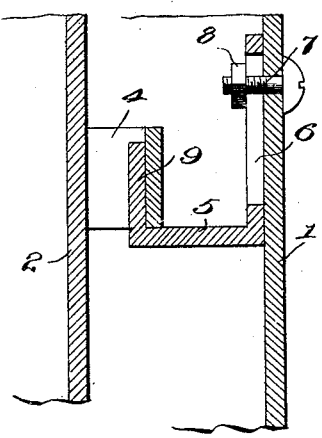
Figure 3:
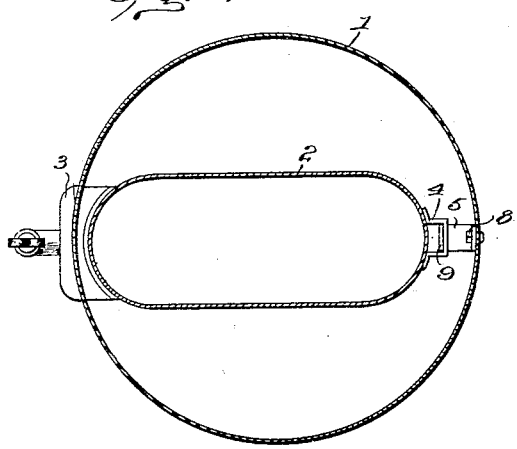
Figure 4:
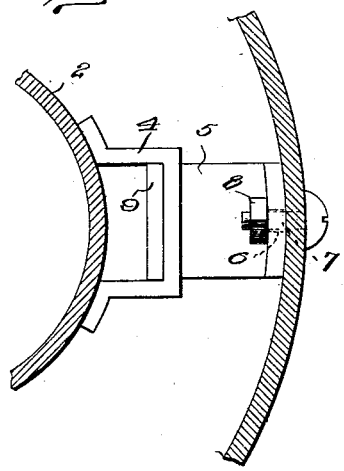

In the accompanying drawings, Figure 1 is a vertical sectional view of a structure embodying our invention in one form. Fig. 2 is an enlarged detail view of a portion of Fig. 1. Fig 3 is a plan section taken on the line *x x* of Fig. 1 and looking in the direction of the arrows, and Fig. 4 is an enlarged detail view of a portion of Fig. 3.

In the said drawings, 1 indicates the outer or water vessel, and 2 the inner or milk vessel, the two being connected near their lower ends at the front of the separator by means of a coupling 3, which is a separable coupling of any approved type—such, for instance, as that shown in United States Patent No. 683,128, hereinbefore referred to. At the other side of the separator, diametrically opposite the side where the coupling is located, and consequently at the back of the separator, said vessels are provided with a hook and with an eye or loop, the two engaging each other in such a way as to not only support the rear of the inner vessel vertically, but also prevent lateral motion thereof. Preferably the loop or eye (indicated by the reference numeral 4) is located on the inner vessel, while the hook (indicated by the reference-numeral 5) is located on the outer vessel. These parts are preferably located near the top of the separator and may be secured in position on the respective vessels by any suitable means—as, for instance, by soldering. We prefer, however, to connect the hook to the outer vessel in such a way as to make it vertically adjustable, and to this end the portion of the hook lying against the wall of said vessel is provided with a vertical slot 6, a bolt 7 passing through said slot and through the wall of the vessel 1 and being provided with a clamping-nut 8. It will be observed that the end 9 of the hook, which enters the eye or loop 4, fits the same with sufficient nicety to prevent any lateral motion of the parts, thereby preventing any strain upon the coupling 3, and consequently preventing any leakage at said coupling which might arise from such lateral motion. It will also be observed that the space between the bottoms of the inner and outer cans is free and unobstructed, so that the water may circulate freely in said space, thereby heightening the cooling effect. It will also be observed that the connection at the rear of the cans is a readily-separable one, so that when the coupling 3 is separated the inner vessel may be readily lifted out or removed from the outer vessel.

We do not wish to be understood as limiting ourselves strictly to the precise details of construction hereinbefore described, and shown in the accompanying drawings, as it is obvious that these details may be modified without departing from the principle of our invention.

Having thus fully described our invention, what we claim as new, and desire to secure by Letters Patent, is—

1. In a cream-separator, the combination, with an inner and an outer vessel connected at the front by a separable coupling, of a hook-and-eye connection between said vessels at the rear, supporting the inner vessel both vertically and against lateral movement, substantially as described.

2. In a cream-separator, the combination, with an inner and an outer vessel connected at the front by a separable coupling, of a loop or eye secured to the outer surface of the back of the inner vessel near the top thereof, and a hook secured to the inner wall of the outer vessel and adapted to engage the eye or loop to support the same vertically and prevent lateral motion thereof, substantially as described.

3. In a cream-separator, the combination, with an inner and an outer vessel connected at the front by a separable coupling, of a loop or eye secured at the outer surface of the back of the inner vessel near the top thereof, and a hook secured to the inner wall of the outer vessel and adapted to engage the eye or loop to secure the same vertically and prevent lateral motion thereof, said loop being vertically adjustable relatively to the outer vessel, substantially as described.

In testimony whereof we affix our signatures in presence of two witnesses.

ADAM D. LUGIBIHL.
HENRY D. ZEHRBACH.

Witnesses:
FRANK A. EATON,
E. T. BURNS.